US010560957B2

(12) United States Patent
Brueck et al.

(10) Patent No.: US 10,560,957 B2
(45) Date of Patent: Feb. 11, 2020

(54) OUT-OF-SYNC GRANT HANDLING IN A WIRELESS COMMUNICATION SYSTEM

(71) Applicant: QUALCOMM Incorporated, San Diego, CA (US)

(72) Inventors: Stefan Brueck, Neunkirchen am Brand (DE); Sunil Kumar Kandukuri Narayana, San Diego, CA (US); Brian George, San Diego, CA (US); Chengjin Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/013,674

(22) Filed: Jun. 20, 2018

(65) Prior Publication Data

US 2019/0394791 A1 Dec. 26, 2019

(51) Int. Cl.
*H04W 74/08* (2009.01)
*H04W 72/14* (2009.01)
*H04W 72/12* (2009.01)
*H04W 16/14* (2009.01)

(52) U.S. Cl.
CPC ... *H04W 72/1268* (2013.01); *H04W 72/1215* (2013.01); *H04W 72/1242* (2013.01); *H04W 72/14* (2013.01); *H04W 74/0816* (2013.01); *H04W 74/0891* (2013.01); *H04W 16/14* (2013.01)

(58) Field of Classification Search
CPC ......... H04W 72/1268; H04W 72/1215; H04W 74/0816; H04W 72/1242; H04W 72/14; H04W 74/0891; H04W 16/14
See application file for complete search history.

(56) References Cited

U.S. PATENT DOCUMENTS

| 8,259,752 | B2* | 9/2012 | Terry | H04L 1/0025 370/469 |
| 8,441,953 | B1* | 5/2013 | Becker | H04L 12/4625 178/69 A |
| 2011/0170495 | A1* | 7/2011 | Earnshaw | H04W 72/02 370/329 |
| 2014/0362780 | A1* | 12/2014 | Malladi | H04W 16/14 370/329 |
| 2015/0049709 | A1* | 2/2015 | Damnjanovic | H04L 5/0055 370/329 |
| 2015/0172984 | A1* | 6/2015 | Racz | H04W 56/001 370/331 |
| 2017/0273056 | A1* | 9/2017 | Papasakellariou | H04W 72/042 |
| 2018/0098223 | A1* | 4/2018 | Hugl | H04W 72/1268 |
| 2018/0263029 | A1* | 9/2018 | Li | H04L 1/18 |
| 2018/0368133 | A1* | 12/2018 | Park | H04W 72/048 |
| 2019/0014591 | A1* | 1/2019 | Lei | H04W 72/1289 |

* cited by examiner

*Primary Examiner* — Un C Cho
*Assistant Examiner* — Lalita W Pace
(74) *Attorney, Agent, or Firm* — Arent Fox LLP (57) ABSTRACT

The present disclosure relates to resolving out-of-sync uplink grants for communication in an unlicensed spectrum. For example, a user equipment (UE) may receive an uplink grant from a network entity on a downlink communication channel, wherein the uplink grant is associated with a system frame number (SFN). The UE may further determine, based on the SFN, that the uplink grant is out of order with one or more stored uplink grants within a queue. Additionally, the UE may insert the uplink grant in an ordered position within the queue relative to the one or more stored uplink grants.

28 Claims, 6 Drawing Sheets

OUT-OF-SYNC GRANT HANDLING IN A WIRELESS COMMUNICATION SYSTEM

BACKGROUND

Aspects of the present disclosure relate generally to wireless communication networks, and more particularly, to out-of-sync grant handling for communication in a wireless communication system.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-low latency (ULL) and/or ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for various communications technology such as, but not limited to communication within an unlicensed spectrum, resolving out-of-sync grant scenarios between cells and/or user equipments may provide a desired level of speed or customization for efficient operation. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure includes a method at a user equipment (UE) operating in a wireless communication network. The method may include receiving an uplink grant from a network entity on a downlink communication channel, wherein the uplink grant is associated with a system frame number (SFN). The method may further include determining, based on the SFN, that the uplink grant is out of order with one or more stored uplink grants within a queue. Additionally, the method may include inserting the uplink grant in an ordered position within the queue relative to the one or more stored uplink grants.

In another aspect, the present disclosure includes a UE for wireless communication including a memory and at least one processor in communication with the memory. The at least one processor may be configured to receive an uplink grant from a network entity on a downlink communication channel, wherein the uplink grant is associated with an SFN. The at least one processor may further be configured to determine, based on the SFN, that the uplink grant is out of order with one or more stored uplink grants within a queue. Additionally, the at least one processor may be configured to insert the uplink grant in an ordered position within the queue relative to the one or more stored uplink grants.

In an additional aspect, the present disclosure includes a UE for wireless communication. The UE may include means for receiving an uplink grant from a network entity on a downlink communication channel, wherein the uplink grant is associated with a SFN. The UE may further include means for determining, based on the SFN, that the uplink grant is out of order with one or more stored uplink grants within a queue. The UE may additionally include means for inserting the uplink grant in an ordered position within the queue relative to the one or more stored uplink grants.

In yet another aspect, the present disclosure includes a computer-readable medium for wireless communications at a UE. The computer-readable medium may include code for receiving an uplink grant from a network entity on a downlink communication channel, wherein the uplink grant is associated with a SFN. The computer-readable medium may further include code for determining, based on the SFN, that the uplink grant is out of order with one or more stored uplink grants within a queue. Additionally, the computer-readable medium may include code for inserting the uplink grant in an ordered position within the queue relative to the one or more stored uplink grants.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

Figure 2:
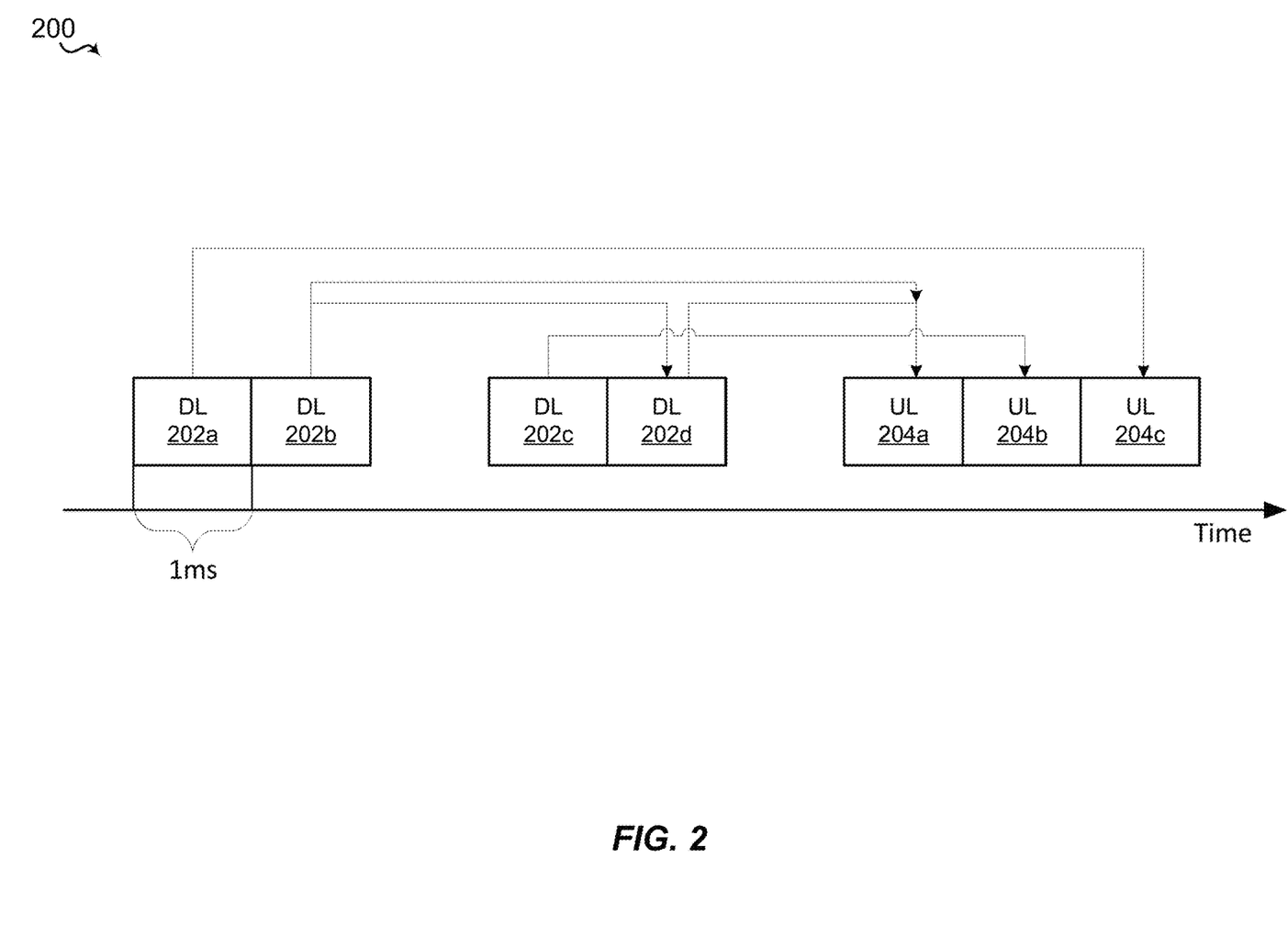
FIG. 2 is a diagram of a grant reception scheme in accordance with one or more aspects of the present disclosure.

The present disclosure generally relates to handling out-of-sync grants at a user equipment (UE) within an Enhanced Licensed Assisted Access (eLAA) in Unlicensed Spectrum system. Listen-before-talk (LBT) is a procedure whereby radio transmitters first sense the medium and transmit if the medium is sensed to be idle, which is also called clear channel assessment (CCA). The CCA utilizes at least energy detection to determine the presence of signals on a channel. LBT is highly beneficial for fair and friendly coexistence with incumbent systems in the unlicensed spectrum and with other LAA networks. Specifically, transmission in the unlicensed 5 GHz band may be allowed if both an uplink grant is assigned by the network (e.g., eNB) to the UE and a clear channel assessment (CCA) procedure has passed. For example, a network entity such as an ENB may request the UE to perform a full extended CCA (e.g., CAT4 LBT) per carrier. In some networks or radio access technologies (RATs) (e.g., Long Term Evolution (LTE)), uplink grants by the network entity (e.g., eNB) may be transmitted and/or received synchronously or in order. However, eLAA grants in a communication network utilizing Unlicensed Spectrum may be received by the UE asynchronously or out of order (e.g., as shown in FIG. 2). Further, downlink grants may need to be delayed due to LBT failures at the network entity. Hence, the UE may not be afforded enough time for conducting CCA and/or extended CCA procedures for the late or out of order grants, and thereby resulting in potential uplink performance degradations or communication failures. As such, it would be desirable to synchronize uplink grants received from the network entity at the UE to provide improved uplink communication in an eLAA communication environment.

Accordingly, in an aspect, the present aspects provide a UE that may resolve out-of-sync uplink grants for communication in an unlicensed spectrum. For example, the UE may receive an uplink grant from a network entity on a downlink communication channel, wherein the uplink grant is associated with a system frame number (SFN). The UE may further determine, based on the SFN, that the uplink grant is out of order with one or more stored uplink grants within a queue. Additionally, the UE may insert the uplink grant in an ordered position within the queue relative to the one or more stored uplink grants.

Additional features of the present aspects are described in more detail below with respect to FIGS. 1-6.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
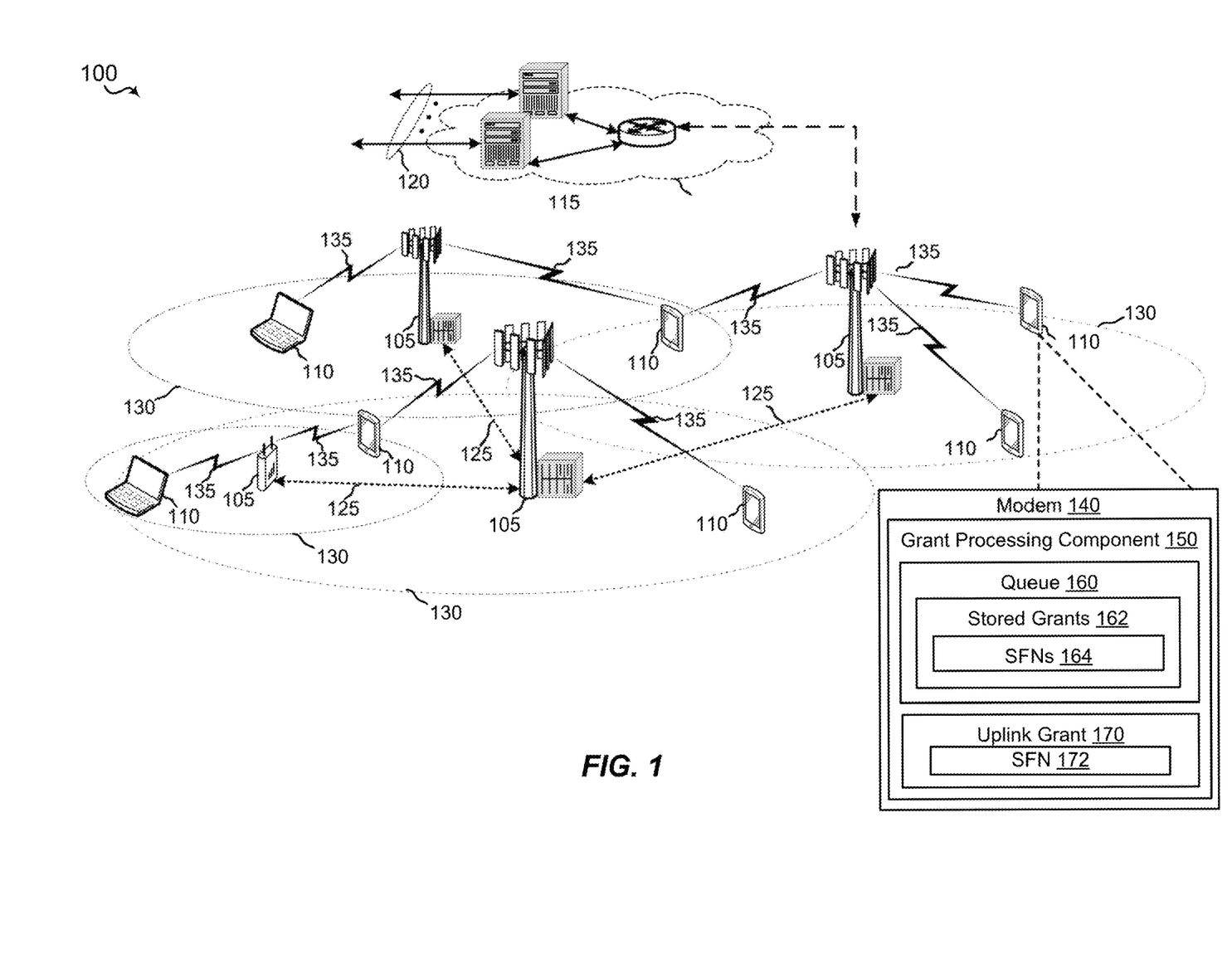
FIG. 1 is a schematic diagram of an example of a wireless communication network including at least one user equipment (UE) having a grant processing component.

Referring to FIG. 1, in accordance with various aspects of the present disclosure, an example wireless communication network 100 may include at least one base station 105 in communication with a UE 110. In some aspects, as used herein, the base station 105 may also be referred to as a network entity. The UE 110 may have a modem 140 including a grant processing component 150. In particular, the grant processing component 150 may include a queue 160 that stores grants 162 received from the base station 105. For example, the grant processing component 150 executing the eCCA procedure may maintain the queue 160 of the incoming grants. The stored grants 162 may be arranged in the order they were received. Typically, the stored grants 162 may be arranged according to their respective SFNs 164. That is, as the grants are received, the grant processing component 150 may store the grants 162 in ascending order based on their SFNs 164. However, grants may be asynchronously received resulting in the an uplink grant 170 that may have been last received being out of order with respect to the stored grants 162. More specifically, the uplink grant 170 may have an SFN 172 that is lower than an SFN of a last stored grant in the queue 160. To resolve such out of order arrangement during or while the eCCA procedure, grants such as the uplink grant 170 may be inserted at their correct position in the queue 160 with respect to the stored grants 162 in accordance with or based at least on the SFN 172 of the uplink grant 170 and the SFNs 164 of the stored grants 162. The foregoing may be done with or without interrupting ongoing eCCAs. Further, if a new grant such the uplink grant 170 is inserted at the top or front of the queue 160, the ongoing eCCA may be aborted and a new eCCA for the new grant may be initiated.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNodeB (gNB), Home NodeB, a Home eNodeB, a relay, or some other suitable terminology. The geographic coverage area 130 for a base station 105 may be divided into sectors or cells making up a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a new radio (NR) or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). A micro cell may cover a geographic area larger than a pico cell and a femto cell, but smaller than a macro cell. An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base station 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz), and/or millimeter wave spectrum (mmW). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Referring to FIG. 2, for instance, a diagram of a grant reception scheme 200 demonstrates an out-of-sync scenario which may result in uplink transmission degradations. As illustrated, four downlink grants 202*a*-202*d* may be received prior to three uplink grants 204*a*-204*c*. For example, a first downlink grant 202*a* may trigger a last uplink grant 204*c*. In a similar manner, a second downlink grant 202*b* may trigger the first uplink grant 204*a*, which may be earliest grant available for uplink transmission. However, for grants that are arriving out-of-sync, there may not be enough time for to perform a CCA procedure, thereby resulting in dropping uplink transmission for certain subframes.

Figure 3:
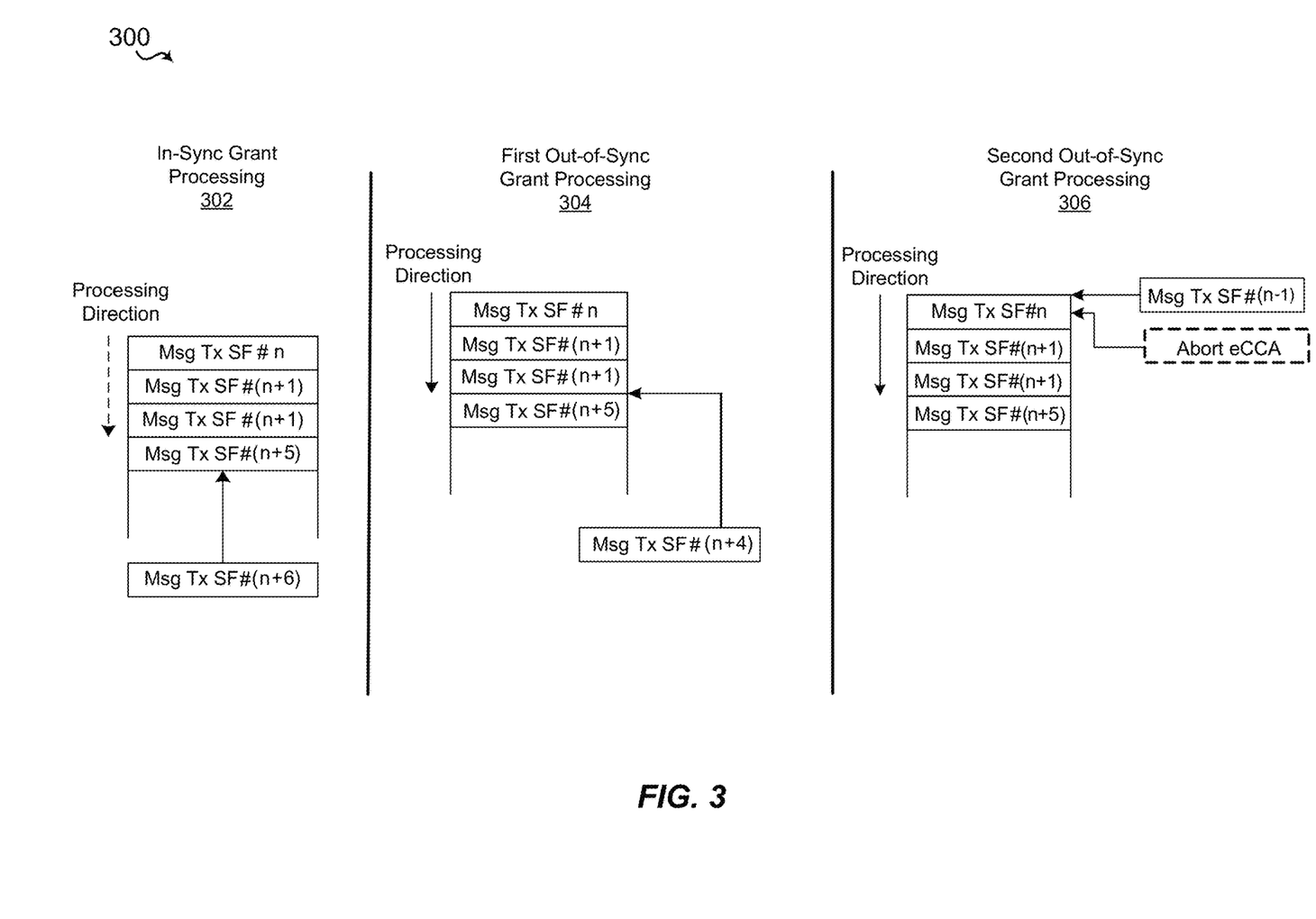
FIG. 3 is a diagram of various grant processing implementations in accordance with one or more aspects of the present disclosure.

Referring to FIG. 3, a diagram of various grant processing implementations 300 may be performed by the UE 110 to synchronize out of order grants. For example, the UE 110 may use in-sync grant processing 302 to process grants as they arrive in order. That is, as the UE 110 receives grants from the network entity, the UE 110 may insert the grants in the queue 160 based on their respective SFN. The in-sync grant processing 302 may work effectively for in-sync grants or grants that are received in order according to their SFNs.

However, during out-of-sync scenarios, the UE 110 may use one of at least two out-of-sync grant processing implementations. In particular, a first out-of-sync grant processing 304 may process or insert out of order grants in a correct position within the queue 160. For instance, a grant (e.g., Msg Tx SF#(n+4)) having an SFN lower than one or more grants within the queue 160 may be received. In this example, the last received grant (e.g., Msg Tx SF#(n+5)) may be the grant having a higher SFN than the most recently received grant. However, the grant having a higher SFN may be located at any position within the queue 160. Accordingly, the first out-of-sync grant processing 304 may insert grants at their correct position in the queue 160 with respect to the SFNs with or without interrupting ongoing CCAs.

A second out-of-sync grant processing 306 may process or insert out of order grants in a distinct manner compared to the first out-of-sync grant processing 304. Specifically, if a new grant is received, a current grant or CCA procedure for a current SFN may be aborted and the new grant may be inserted at the top of queue 160. A new CCA procedure may be triggered as a result of aborting the current CCA procedure and inserting the new grant at the beginning. For instance, a CCA procedure may be implemented for the grant corresponding to Msg Tx SF#(n), which may be at the top of the queue 160 when the CCA procedure was initiated. However, a grant corresponding to Msg Tx SF#(n−1) may be received from the network entity during the CCA procedure. According to the second out-of-sync grant processing 306, the CCA procedure may be aborted and the Msg Tx SF#(n−1) may be inserted at the top of the queue 160 to trigger a new CCA procedure for the grant corresponding to Msg Tx SF#(n−1).

Figure 4:
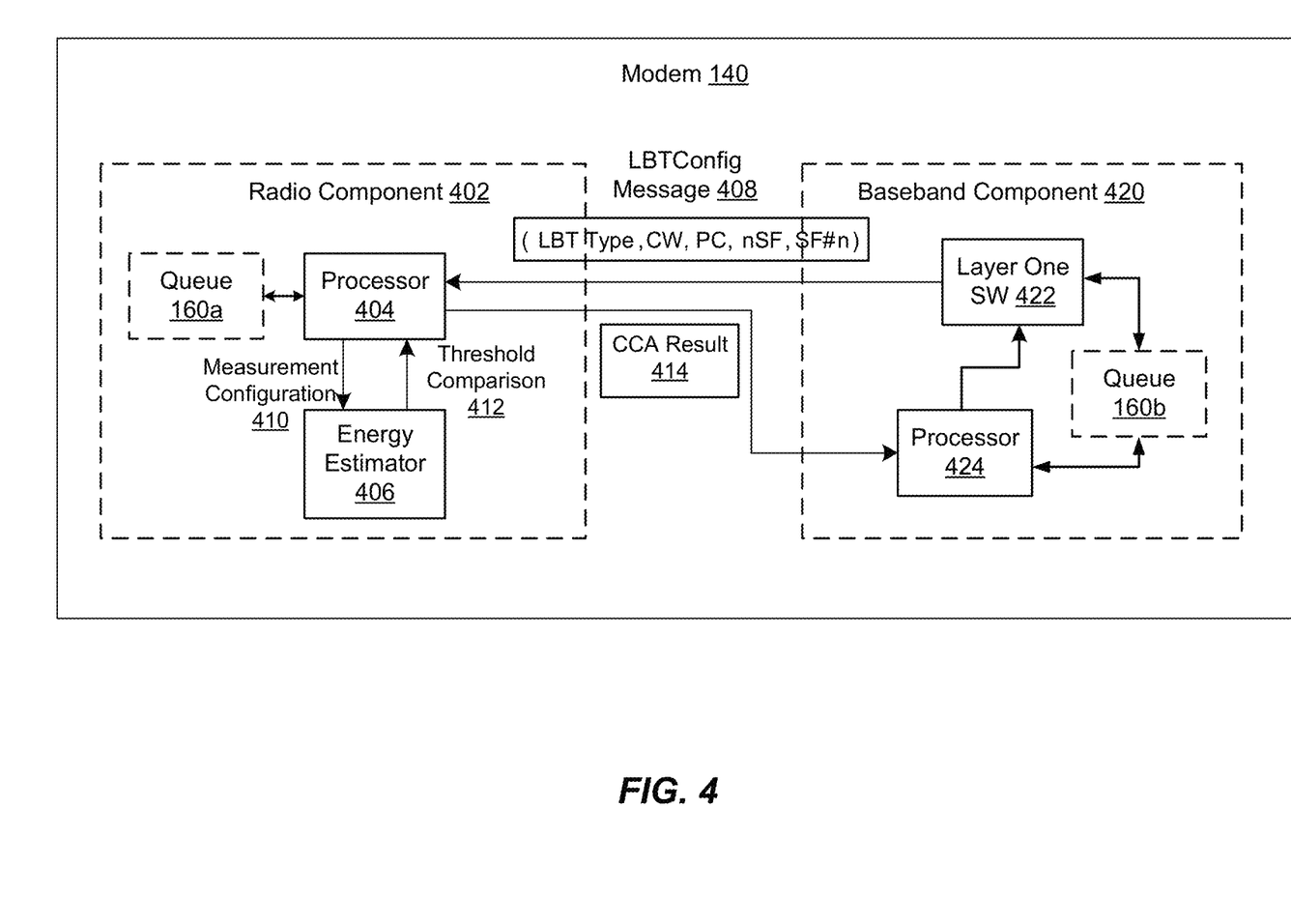
FIG. 4 is a schematic diagram of an example modem including one or more components for resolving out-of-sync grants in accordance with one or more aspects of the present disclosure.

Referring to FIG. 4, a schematic diagram of an example modem 140 may include one or more components for resolving out-of-sync grants. In particular, modem 140 may include radio component 402 and baseband component 420. In some aspects, one or both of the radio component 402 and the baseband component 420 may form the grant processing component 150. In some aspects, the radio component 402 and the baseband component 420 may be on the same or different chips. In some aspects, two or more components of the modem 140 may be integrated or formed as a single component. The radio component 402 may include a processor 404, an energy estimator 406, and an optional queue 160a. The baseband component 420 may include layer one software 422, a processor 424, and an optional queue 160b.

According to the first out-of-sync grant processing 304, the layer one software 422 may sort all grants and deliver the LBTConfig message 408 in order to the radio component 402. The LBTConfig message 408 may include at least one of a LBT type, a contention window (CW) provided by the network entity in the grant and specifying a number of blocks needed to be measured for LBT, a priority class (PC) defining a configuration of LBT performed at the radio component, an nSF indicating a number of subframes the LBT if valid for, and an SFN indicating in which subframe the transmission will occur.

The radio component 402 may add new messages at the end of the queue 160a. The queue 160b depth or length in the baseband component 420 may be fixed or variable (e.g., may hold up to 15-20 grants). An advantage of this approach may be that the radio component 402 does not need to order the grants and can process the first element in the queue 160a. In some aspects, the length of the queue 160a may be four grants. Potential disadvantages may include that full ordering can be achieved 4 ms ahead of uplink transmission (e.g., LBTConfig message 108 can be sent roughly 4 ms ahead of the transmission boundary). Further, with a physical uplink shared channel (PUSCH) trigger B arriving 2 ms ahead of the transmission, the LBTConfig message 408 can be sent roughly 2 ms ahead. As such, the foregoing does not provide support for contention window sizes 511 and 1023 for priority classes 3 and 4. Thus, uplink transmissions are dropped in such cases.

According to the second out-of-sync grant processing 306, the layer one software 422 at the baseband component 420 may send the LBTConfig message 408 as soon as a grant is received from the network entity. In other words, no ordering occurring at the layer one software 422. For in-sync grants, the radio component 402 may store new LBT messages in the queue 160a at the end and starts processing from the front. For out-of-sync grants the radio component 402 may add the grants to the queue 160a at the right position according to the SFN of the grant. If an incoming grant has a lower SFN than the currently running eCCA, then the eCCA may be aborted and a new one may be started. The current eCCA procedure may be aborted if the priority class of the new grant is lower than the current priority class.

Otherwise the eCCA can be associated with the new grant. A size of the queue 160a at the radio component 402 may be 15.

In some aspects, out-of-sync grants may be handled between or in coordination with the respective queues 160a and 160b at the radio component 402 and the baseband component 420. For example, the radio component 402 may maintain a fixed queue 160a (e.g., of size four), while the baseband component 420 maintains the queue 160b for additional grants. If additional out-of-sync grants are added to the queue 160a of the radio component 402, a last grant may be pushed back or transferred to the queue 160b at the baseband component 420 to maintain the size of the queue 160a. In some aspects, the queue 160a may be halted when an out-of-sync grant needs to be added. Further, in some aspects, a running eCCA procedure may be aborted even if the out-of-sync grant is not added to the top of the queue 160a. The eCCA procedure may appear as failing, yet a new start of an eCCA procedure may be initiated with a same status of counter N. The expected delay for halting and adding additional grant may be 100-200 nanoseconds.

The eCCA procedure at the radio component 402 may be performed at the energy estimator 406 by making a threshold comparison 412 using the measurement configuration 410. The CCA result 414 may then be provided to the baseband component 420. For example, the CCA result 414 may correspond to a pass or fail of the CCA procedure, which may indicate whether the channel on which the transmission is scheduled to occur is available or occupied.

Figure 5:
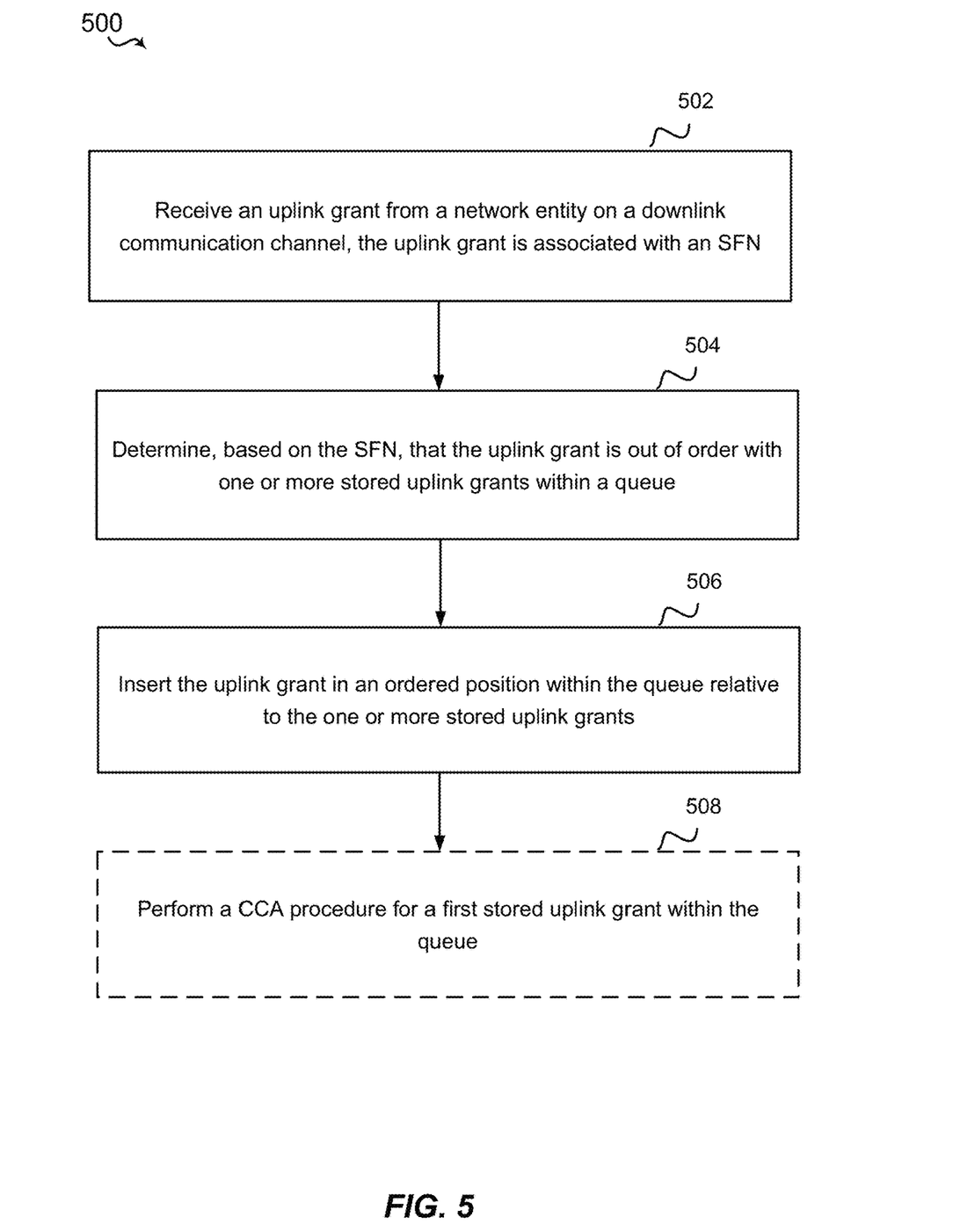
FIG. 5 is a flow diagram of another example of a method of wireless communication at a UE.

Referring to FIG. 5, for example, a method 500 of wireless communication at a UE such as UE 110 according to the aspects described herein may resolve out-of-sync grants according to one or more of the herein-defined actions.

At block 602, the method 500 may receive an uplink grant from a network entity on a downlink communication channel, the uplink grant is associated with an SFN. For example, the grant processing component 150 and/or one or more additional components as described herein with respect to FIGS. 4 and 6 may receive an uplink grant 170 from a network entity (e.g., base station 105) on a downlink communication channel. In some aspects, the uplink grant 170 may be associated with an SFN 172.

At block 504, the method 500 may determine, based on the SFN, that the uplink grant is out of order with one or more stored uplink grants within a queue. For example, the grant processing component 150 and/or one or more additional components as described herein with respect to FIGS. 4 and 6 may determine, based on the SFN 172, that the uplink grant 170 is out of order with one or more stored uplink grants 162 within a queue 160.

In some aspects, determining that the uplink grant 170 is out of order may include determining that the SFN 172 of the uplink grant 170 is less than one or more respective SFNs 164 of the one or more stored uplink grants 162 within the queue 160.

In some aspects, determining that the uplink grant 170 is out of order may include determining that the SFN 172 of the uplink grant 170 is less than the SFN of the first stored uplink grant associated with the CCA procedure.

At block 606, the method 500 may insert the uplink grant in an ordered position within the queue relative to the one or more stored uplink grants. For example, the grant processing component 150 and/or one or more additional components as described herein with respect to FIGS. 4 and 6 may insert the uplink grant 170 in an ordered position within the queue 160 relative to the one or more stored uplink grants 162.

In some aspects, inserting the uplink grant 170 in the ordered position within the queue 160 relative to the one or more stored uplink grants 162 may include inserting the uplink grant before the one or more stored uplink grants based on a determination that the SFN of the uplink grant is less than the one or more respective SFNs of the one or more stored uplink grants within the queue.

In some aspects, inserting the uplink grant 170 in the ordered position within the queue 160 relative to the one or more stored uplink grants 162 may include aborting the CCA procedure based on a determination that the SFN 172 of the uplink grant 170 is less than the SFN of the first stored uplink grant and initiating another CCA procedure for the uplink grant 170.

In some aspects, although not shown, the method 500 may determine whether a priority class of the uplink grant 170 is lower than a priority grant of the stored uplink grant and associate the CCA with the uplink grant 170 based on a determination that the priority class of the uplink grant 170 is not lower than a priority grant of the stored uplink grant. Further, in some aspects, initiating another CCA procedure for the uplink grant 170 may include initiating another CCA procedure based on a determination that the priority class of the uplink grant 170 is lower than a priority grant of the stored uplink grant.

At block 608, the method 500 may optionally perform a CCA procedure for a first stored uplink grant within the queue. For example, the grant processing component 150 and/or one or more additional components as described herein with respect to FIGS. 4 and 6 may perform a CCA procedure for a first stored uplink grant within the queue 160. In some aspects, the CCA procedure may be performed prior to or during reception of the uplink grant 170 (e.g., block 602). In some aspects, the CCA procedure may correspond to an eCCA procedure.

Although not shown, the method 500 may further determine whether the CCA procedure indicates an idle uplink communication channel, transmit on the uplink communication channel according to the first stored uplink grant based on a determination that the CCA procedure indicates an idle uplink communication channel, and forgo transmission on the uplink communication channel according to the first stored uplink grant based on a determination that the CCA procedure does not indicate an idle uplink communication channel. In some aspects, transmitting on the uplink communication channel may include transmitting using an Unlicensed Spectrum (e.g., eLAA) such that the uplink grant 170 may correspond to an unlicensed (e.g., eLAA) uplink grant.

Figure 6:
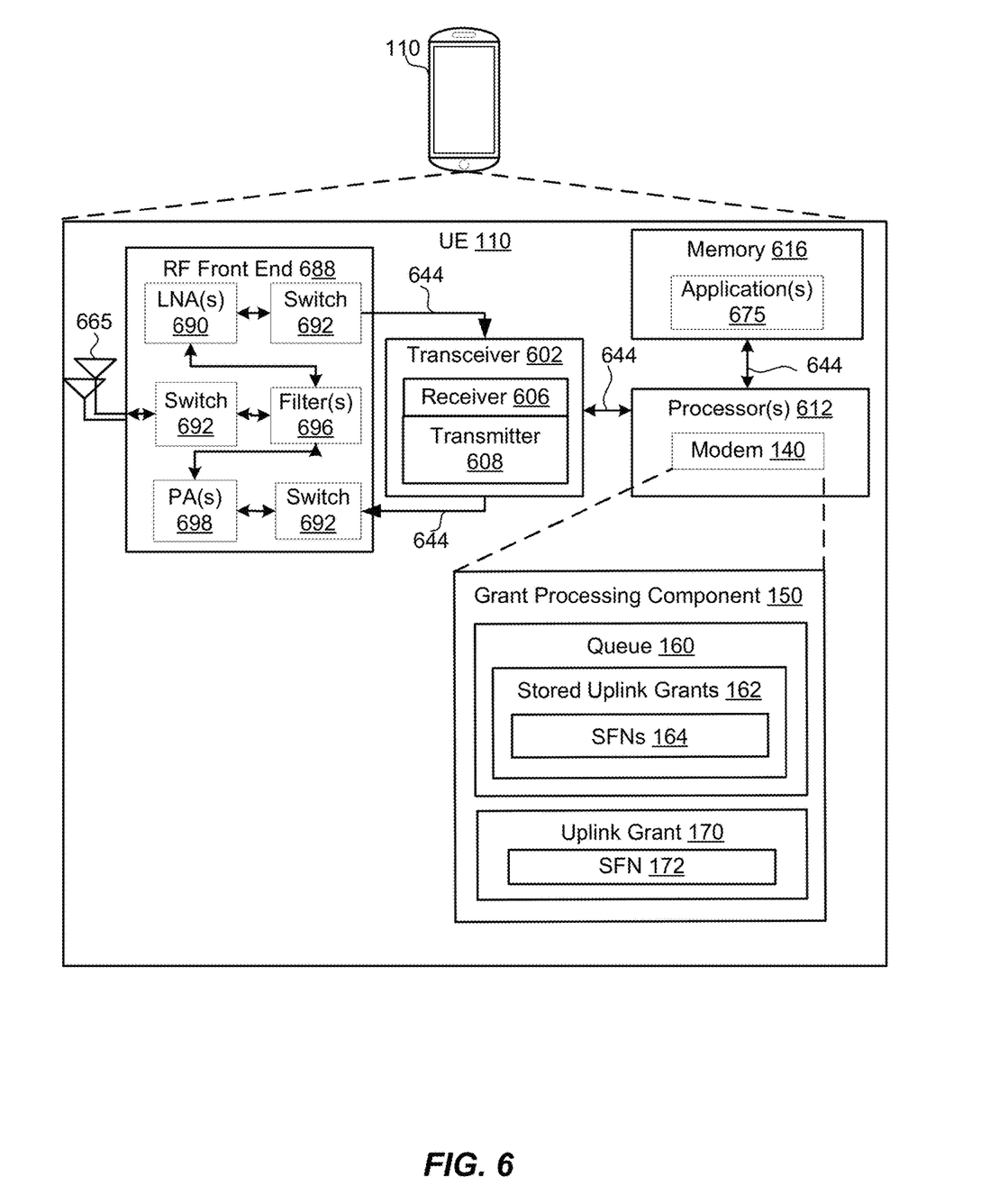
FIG. 6 is a schematic diagram of example components of the UE of FIG. 1.

Referring to FIG. 6, one example of an implementation of UE 110 may include a variety of components, some of which have already been described above, but including components such as one or more processors 612 and memory 616 and transceiver 602 in communication via one or more buses 644, which may operate in conjunction with modem 140 and grant processing component 150 as described herein. Further, the one or more processors 612, modem 140, memory 616, transceiver 602, radio frequency (RF) front end 688 and one or more antennas 665, may be configured to support voice and/or data calls (simultaneously or non-simultaneously) in one or more radio access technologies. In some aspects, the modem 140 may be the same as or similar to the modem 140.

In an aspect, the one or more processors 612 can include a modem 140 that uses one or more modem processors. The various functions related to grant processing component 150 may be included in modem 140 and/or processors 612 and, in an aspect, can be executed by a single processor, while in other aspects, different ones of the functions may be executed by a combination of two or more different processors. For example, in an aspect, the one or more processors 612 may include any one or any combination of a modem processor, or a baseband processor, or a digital signal processor, or a transmit processor, or a receiver processor, or a transceiver processor associated with transceiver 602. In other aspects, some of the features of the one or more processors 612 and/or modem 140 associated with resource identification component 150 may be performed by transceiver 602.

Also, memory 616 may be configured to store data used herein and/or local versions of applications 675 or grant processing component 150 and/or one or more of its subcomponents being executed by at least one processor 612. Memory 616 can include any type of computer-readable medium usable by a computer or at least one processor 612, such as random access memory (RAM), read only memory (ROM), tapes, magnetic discs, optical discs, volatile memory, non-volatile memory, and any combination thereof. In an aspect, for example, memory 616 may be a non-transitory computer-readable storage medium that stores one or more computer-executable codes defining grant processing component 150 and/or one or more of its subcomponents, and/or data associated therewith, when UE 110 is operating at least one processor 612 to execute grant processing component 150 and/or one or more of its subcomponents.

Transceiver 602 may include at least one receiver 606 and at least one transmitter 608. Receiver 606 may include hardware, firmware, and/or software code executable by a processor for receiving data, the code comprising instructions and being stored in a memory (e.g., computer-readable medium). Receiver 606 may be, for example, a RF receiver. In an aspect, receiver 606 may receive signals transmitted by at least one base station 105. Additionally, receiver 606 may process such received signals, and also may obtain measurements of the signals, such as, but not limited to, Ec/Io, SNR, RSRP, RSSI, etc. Transmitter 608 may include hardware, firmware, and/or software code executable by a processor for transmitting data, the code comprising instructions and being stored in a memory (e.g., computer-readable medium). A suitable example of transmitter 608 may include, but is not limited to, an RF transmitter.

Moreover, in an aspect, UE 110 may include RF front end 688, which may operate in communication with one or more antennas 665 and transceiver 602 for receiving and transmitting radio transmissions, for example, wireless communications transmitted by at least one base station 105 or wireless transmissions transmitted by UE 110. The RF front end 688 may be communicatively couples with one or more antennas 665 and can include one or more low-noise amplifiers (LNAs) 690, one or more switches 692, one or more power amplifiers (PAs) 698, and one or more filters 696 for transmitting and receiving RF signals.

In an aspect, LNA 690 can amplify a received signal at a desired output level. In an aspect, each LNA 690 may have a specified minimum and maximum gain values. In an aspect, RF front end 688 may use one or more switches 692 to select a particular LNA 690 and its specified gain value based on a desired gain value for a particular application.

Further, for example, one or more PA(s) 698 may be used by RF front end 688 to amplify a signal for an RF output at a desired output power level. In an aspect, each PA 698 may have specified minimum and maximum gain values. In an aspect, RF front end 688 may use one or more switches 692 to select a particular PA 698 and a corresponding specified gain value based on a desired gain value for a particular application.

Also, for example, one or more filters 696 can be used by RF front end 688 to filter a received signal to obtain an input RF signal. Similarly, in an aspect, for example, a respective filter 696 can be used to filter an output from a respective PA 698 to produce an output signal for transmission. In an aspect, each filter 696 can be connected to a specific LNA 690 and/or PA 698. In an aspect, RF front end 688 can use one or more switches 692 to select a transmit or receive path using a specified filter 696, LNA 690, and/or PA 698, based on a configuration as specified by transceiver 602 and/or processor 612.

As such, transceiver 602 may be configured to transmit and receive wireless signals through one or more antennas 665 via RF front end 688. In an aspect, transceiver may be tuned to operate at specified frequencies such that UE 110 can communicate with, for example, one or more base stations 105 or one or more cells associated with one or more base stations 105. In an aspect, for example, modem 140 can configure transceiver 602 to operate at a specified frequency and power level based on the UE configuration of the UE 110 and the communication protocol used by the modem 140.

In an aspect, the modem 140 can be a multiband-multimode modem, which can process digital data and communicate with transceiver 602 such that the digital data is sent and received using transceiver 602. In an aspect, the modem 140 can be multiband and be configured to support multiple frequency bands for a specific communications protocol. In an aspect, the modem 140 can be multimode and be configured to support multiple operating networks and communications protocols. In an aspect, the modem 140 can control one or more components of UE 110 (e.g., RF front end 688, transceiver 602) to enable transmission and/or reception of signals from the network based on a specified modem configuration. In an aspect, the modem configuration can be based on the mode of the modem and the frequency band in use. In another aspect, the modem configuration can be based on UE configuration information associated with the UE 110 as provided by the network during cell selection and/or cell reselection.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of communication at a user equipment (UE) operating in a wireless communication network, comprising:
while performing a clear channel assessment (CCA) procedure for a first stored uplink grant of one or more stored uplink grants within a queue;
receiving, asynchronously, an uplink grant from a network entity on a downlink communication channel, wherein the uplink grant is associated with a system frame number (SFN);
determining, based on the SFN, that the uplink grant is out of order with the one or more stored uplink grants within the queue; and
inserting the uplink grant in an ordered position within the queue relative to the one or more stored uplink grants.

2. The method of claim 1, wherein determining that the uplink grant is out of order includes determining that the SFN of the uplink grant is less than one or more respective SFNs of the one or more stored uplink grants within the queue.

3. The method of claim 2, wherein inserting the uplink grant in the ordered position within the queue relative to the one or more stored uplink grants includes inserting the uplink grant before the one or more stored uplink grants based on a determination that the SFN of the uplink grant is less than the one or more respective SFNs of the one or more stored uplink grants within the queue.

4. The method of claim 1, wherein determining that the uplink grant is out of order includes determining that the SFN of the uplink grant is less than an SFN of the first stored uplink grant associated with the CCA procedure.

5. The method of claim 4, wherein inserting the uplink grant in the ordered position within the queue relative to the one or more stored uplink grants includes:
aborting the CCA procedure based on a determination that the SFN of the uplink grant is less than the SFN of the first stored uplink grant; and
initiating another CCA procedure for the uplink grant.

6. The method of claim 5, further comprising:
determining whether a priority class of the uplink grant is lower than a priority class of the first stored uplink grant; and
associating the CCA procedure with the uplink grant based on a determination that the priority class of the uplink grant is not lower than a priority class of the first stored uplink grant,
wherein initiating another CCA procedure for the uplink grant includes initiating another CCA procedure based on a determination that the priority class of the uplink grant is lower than a priority class of the first stored uplink grant.

7. The method of claim 1, further comprising:
determining whether the CCA procedure indicates an uplink communication channel as being in an idle state;
transmitting on the uplink communication channel according to the first stored uplink grant based on a first determination that the CCA procedure indicates the uplink communication channel as being in the idle state; and
forgoing transmission on the idle uplink communication channel according to the first stored uplink grant based on a second determination that the CCA procedure does not indicate the uplink communication channel as being in the idle state.

8. The method of claim 7, wherein transmitting on the uplink communication channel includes transmitting on an unlicensed spectrum, and wherein the uplink grant corresponds to an unlicensed uplink grant.

9. The method of claim 1, wherein the CCA procedure corresponds to an extended CCA procedure.

10. A user equipment (UE) for wireless communication, comprising:
a memory; and at least one processor in communication with the memory, wherein the at least one processor is configured to:
while performing a clear channel assessment (CCA) procedure for a first stored uplink grant of one or more stored uplink grants within a queue:
receive, asynchronously, an uplink grant from a network entity on a downlink communication channel, wherein the uplink grant is associated with a system frame number (SFN);
determine, based on the SFN, that the uplink grant is out of order with the one or more stored uplink grants within the queue; and
insert the uplink grant in an ordered position within the queue relative to the one or more stored uplink grants.

11. The UE of claim 10, wherein to determine that the uplink grant is out of order, the at least one processor is further configured to determine that the SFN of the uplink grant is less than one or more respective SFNs of the one or more stored uplink grants within the queue.

12. The UE of claim 11, wherein to insert the uplink grant in the ordered position within the queue relative to the one or more stored uplink grants, the at least one processor is further configured to insert the uplink grant before the one or more stored uplink grants based on a determination that the SFN of the uplink grant is less than the one or more respective SFNs of the one or more stored uplink grants within the queue.

13. The UE of claim 10, wherein to determine that the uplink grant is out of order, the at least one processor is further configured to determine that the SFN of the uplink grant is less than an SFN of the first stored uplink grant associated with the CCA procedure.

14. The UE of claim 13, wherein to insert the uplink grant in the ordered position within the queue relative to the one or more stored uplink grants, the at least one processor is further configured to:
abort the CCA procedure based on a determination that the SFN of the uplink grant is less than the SFN of the first stored uplink grant; and
initiate another CCA procedure for the uplink grant.

15. The UE of claim 14, wherein the at least one processor is further configured to:
determine whether a priority class of the uplink grant is lower than a priority class of the first stored uplink grant; and
associate the CCA procedure with the uplink grant based on a determination that the priority class of the uplink grant is not lower than a priority class of the first stored uplink grant, wherein to initiate another CCA procedure for the uplink grant, the at least one processor is further configured to initiate another CCA procedure based on a determination that the priority class of the uplink grant is lower than a priority class of the first stored uplink grant.

16. The UE of claim 10, wherein the at least one processor is further configured to:
determine whether the CCA procedure indicates an uplink communication channel as being in an idle state; and
transmit on the uplink communication channel according to the first stored uplink grant based on a first determination that the CCA procedure indicates the uplink communication channel being in the idle state; and
forgo transmission on the uplink communication channel according to the first stored uplink grant based on a second determination that the CCA procedure does not indicate the uplink communication channel as being in the idle state.

17. The UE of claim 16, wherein to transmit on the uplink communication channel, the at least one processor is further configured to transmit on an unlicensed spectrum, and wherein the uplink grant corresponds to an unlicensed uplink grant.

18. The UE of claim 10, wherein the CCA procedure corresponds to an extended CCA procedure.

19. A user equipment (UE) for wireless communication, comprising:
while performing a clear channel assessment (CCA) procedure for a first stored uplink grant of one or more stored uplink grants within a queue:
means for receiving, asynchronously, an uplink grant from a network entity on a downlink communication channel, wherein the uplink grant is associated with a system frame number (SFN);
means for determining, based on the SFN, that the uplink grant is out of order with the one or more stored uplink grants within the queue; and
means for inserting the uplink grant in an ordered position within the queue relative to the one or more stored uplink grants.

20. The UE of claim 19, wherein the means for determining that the uplink grant is out of order includes means for determining that the SFN of the uplink grant is less than one or more respective SFNs of the one or more stored uplink grants within the queue.

21. The UE of claim 20, wherein the means for inserting the uplink grant in the ordered position within the queue relative to the one or more stored uplink grants includes means for inserting the uplink grant before the one or more stored uplink grants based on a determination that the SFN of the uplink grant is less than the one or more respective SFNs of the one or more stored uplink grants within the queue.

22. The UE of claim 19, wherein the means for determining that the uplink grant is out of order includes means for determining that the SFN of the uplink grant is less than an SFN of the first stored uplink grant of the one or more stored uplink grants associated with the CCA procedure.

23. The UE of claim 22, wherein the means for inserting the uplink grant in the ordered position within the queue relative to the one or more stored uplink grants includes:
means for aborting the CCA procedure based on a determination that the SFN of the uplink grant is less than the SFN of the first stored uplink grant; and
means for initiating another CCA procedure for the uplink grant.

24. A non-transitory computer-readable medium storing computer code executable by a processor for wireless communication, comprising code for:
while performing a clear channel assessment (CCA) procedure for a first stored uplink grant of one or more stored uplink grants within a queue:
receiving, asynchronously, an uplink grant from a network entity on a downlink communication channel, wherein the uplink grant is associated with a system frame number (SFN);
determining, based on the SFN, that the uplink grant is out of order with the one or more stored uplink grants within the queue; and
inserting the uplink grant in an ordered position within the queue relative to the one or more stored uplink grants.

25. The non-transitory computer-readable medium of claim 24, wherein determining that the uplink grant is out of order includes determining that the SFN of the uplink grant is less than one or more respective SFNs of the one or more stored uplink grants within the queue.

26. The non-transitory computer-readable medium of claim 25, wherein inserting the uplink grant in the ordered position within the queue relative to the one or more stored uplink grants includes inserting the uplink grant before the one or more stored uplink grants based on a determination that the SFN of the uplink grant is less than the one or more respective SFNs of the one or more stored uplink grants within the queue.

27. The non-transitory computer-readable medium of claim 24, wherein determining that the uplink grant is out of order includes determining that the SFN of the uplink grant is less than an SFN of the first stored uplink grant of the one or more stored uplink grants associated with the CCA procedure.

28. The non-transitory computer-readable medium of claim 27, wherein inserting the uplink grant in the ordered position within the queue relative to the one or more stored uplink grants includes:
aborting the CCA procedure based on a determination that the SFN of the uplink grant is less than the SFN of the first stored uplink grant; and
initiating another CCA procedure for the uplink grant.

* * * * *